United States Patent
Prosperi et al.

(10) Patent No.: US 9,178,733 B2
(45) Date of Patent: Nov. 3, 2015

(54) INTERMEDIATE FREQUENCY RECEIVER WITH DYNAMIC SELECTION OF THE INTERMEDIATE FREQUENCY USED

(71) Applicant: SELEX ES S.P.A., Rome (IT)

(72) Inventors: Antonio Prosperi, Rome (IT); Filippo Nesi, Rome (IT); Stefano Giuliani, Rome (IT); Gabriele Fagioli, Rome (IT)

(73) Assignee: SELEX ES S.P.A., Rome (IT)

( * ) Notice: Subject to any disclaimer, the term of this patent is extended or adjusted under 35 U.S.C. 154(b) by 0 days.

(21) Appl. No.: 14/417,542

(22) PCT Filed: Jul. 31, 2013

(86) PCT No.: PCT/IB2013/056300
§ 371 (c)(1),
(2) Date: Jan. 26, 2015

(87) PCT Pub. No.: WO2014/020558
PCT Pub. Date: Feb. 6, 2014

(65) Prior Publication Data
US 2015/0207654 A1   Jul. 23, 2015

(30) Foreign Application Priority Data

Jul. 31, 2012 (IT) .............................. TO2012A0681

(51) Int. Cl.
*H04B 1/66* (2006.01)
*H04L 27/152* (2006.01)
*H04B 1/10* (2006.01)
(Continued)

(52) U.S. Cl.
CPC .............. *H04L 27/1525* (2013.01); *H04B 1/10* (2013.01); *H04B 1/28* (2013.01); *H04L 27/148* (2013.01)

(58) Field of Classification Search
CPC ............................. H04L 27/1525; H04B 1/10
USPC ......................................................... 375/340
See application file for complete search history.

(56) References Cited

U.S. PATENT DOCUMENTS

| 8,160,529 | B1 * | 4/2012 | Clement et al. ................ 455/255 |
| 8,472,500 | B2 * | 6/2013 | Marton et al. ................. 375/138 |
| 2005/0110563 | A1 * | 5/2005 | Rabinovich et al. ............ 330/52 |

(Continued)

OTHER PUBLICATIONS

International Search Report and Written Opinion from International Application No. PCT/IB2013/056300 mailed Jan. 7, 2014.

(Continued)

*Primary Examiner* — Santiago Garcia
(74) *Attorney, Agent, or Firm* — Dorsey & Whitney LLP

(57) ABSTRACT

The invention relates to an IF receiver that is able to solve the image band problem and, in particular, to reject any interfering signals so as to ensure correct demodulation of a received useful signal without having to interrupt the reception service. The receiver comprises a monitoring branch configured to monitor interference experienced at a plurality of intermediate frequencies usable in reception and select the intermediate reception frequency from the intermediate frequencies usable in reception on the basis of the interference monitoring carried out. Moreover, the monitoring unit is configured to carry out real-time monitoring of interference experienced at the currently used intermediate reception frequency and also at the other intermediate frequencies usable in reception and change, in real time, the used intermediate reception frequency on the basis of the real-time interference monitoring.

7 Claims, 3 Drawing Sheets

(51) Int. Cl.
*H04B 1/28* (2006.01)
*H04L 27/148* (2006.01)

(56) References Cited

U.S. PATENT DOCUMENTS

2005/0143040 A1* 6/2005 Kerth et al. .................. 455/302
2006/0141974 A1 6/2006 Campbell et al.
2007/0207736 A1* 9/2007 Ragan ......................... 455/63.1
2009/0310721 A1 12/2009 Redfern et al.

OTHER PUBLICATIONS

International Preliminary Report on Patentability from International Application No. PCT/IB2013/056300 mailed Jul. 23, 2014.

* cited by examiner

INTERMEDIATE FREQUENCY RECEIVER WITH DYNAMIC SELECTION OF THE INTERMEDIATE FREQUENCY USED

TECHNICAL FIELD OF INVENTION

The present, invention relates to an intermediate frequency receiver in which the intermediate frequency used in reception is dynamically selected so as to reject any interfering signals.

STATE OF THE ART

As is known, currently radio communication systems often employ so-called intermediate frequency (IF) receivers, which are designed to:
- receive radio frequency (RF) signals;
- shift the received RF signals to a predetermined IF;
- process, e.g. filter, the IF signals;
- shift the processed IF signals to baseband (BB); and
- process the BB signals.

The use of IF conversion enables using electronic components, such as amplifiers, filters, analog/digital (A/D) converters, etc., for processing the IF signals, these components being less expensive and/or more efficient than those necessary for the corresponding direct processing of RF signals. For example, the use of IF shifting enables using highly selective frequency filters that could not be made or would be excessively expensive for direct RF processing.

FIG. 1 shows a functional block diagram that represents a typical architecture of an IF receiver (indicated as a whole by reference numeral 10).

In particular, as shown in FIG. 1, the IF receiver 10 comprises:
- an antenna 11 designed to receive an RF signal;
- an amplifier 12 connected to the antenna 11 and designed to amplify the RF signal received by the antenna 11;
- an IF vector demodulator 13, which will hereinafter also be referred to as an analog IF mixer and which is connected to the amplifier 12 and designed to shift the RF signal amplified by the amplifier 12 to IF outputting a corresponding IF in-phase component (I) and a corresponding IF quadrature component (Q);
- low-pass filtering means 14 connected to the IF vector demodulator 13 and designed to apply low-pass filtering to the IF components I and Q provided by the IF demodulator 13;
- A/D conversion means 15 connected to the low-pass filtering means 14 and designed to convert the analog IF components I and Q filtered by the low-pass filtering means 14 into corresponding digital IF components I and Q;
- a digital BB demodulator 16, which will hereinafter also be referred to as a BB digital mixer and which is connected to the A/D conversion means 15 and is configured to demodulate the digital IF components I and Q provided by the A/D conversion means 15 outputting a corresponding digital BB signal; and
- digital processing means 17 connected to the digital BB demodulator 16 and configured to process the digital BB signal provided by the digital BB demodulator 16.

In use, when it receives a signal from amplifier 12 having an RF $f_0$, the IF vector demodulator 13 uses a signal with a frequency $f_{OL1}$, generated by a first local oscillator (OL1) 18, to convert the RF signal into the corresponding components I and Q, having an IF $f_{IF}$ equal to $f_0-f_{OL1}$. In other words, the analog IF mixer 13 outputs a complex signal IQ with the same information content as the RF signal received by the antenna 11 but shifted to IF $f_{IF}=f_0-f_{OL1}$. The low-pass filtering means 14 work at this IF, which low-pass filtering means 14 select the desired channel and send the filtered complex signal IQ to the A/D conversion means 15, which performs the corresponding A/D conversion.

Furthermore, the BB digital mixer 16 uses a second local oscillator (OL2) 19 to shift to BB (i.e., by $-f_{IF}$) the digital complex signal IQ provided by the A/D conversion means 15.

Conveniently, the BB digital mixer 16, the digital processing means 17 and the OL2 19 are implemented by means of a digital signal processor (DSP) and/or a field programmable gate array (FPGA) (indicated as a whole in FIG. 1 by reference numeral 20). In particular, the OL2 19 can be implemented via a computational process of the FPGA, or via firmware in the DSP.

As is known, IF receivers suffer from the so-called image band problem. In order to describe this problem in detail, FIG. 2 shows an example of an operating scenario in which the IF receiver 10 is designed to receive a narrow-band useful signal S at RF $f_0=400$ MHz with $f_0=399.9$ MHz and, therefore, with $f_{IF}=100$ kHz. In this scenario, due to the imperfect balancing of the I and Q branches, an interfering signal I1 positioned at 399.8 MHz, i.e. at −100 kHz with respect to the reference at 0 Hz, as shown in FIG. 2, produces a cochannel image signal I1$i$ at +100 kHz that is superimposed on the useful signal S.

In general, the DSP and/or FPGA 20 of IF receivers are configured to perform a so-called RF imbalance compensation function in order to compensate the geometric distortions present in the reception chain and IF receivers are subjected to calibration processes on the I and Q branches specifically to mitigate the image band problem. However, always with reference to the scenario in FIG. 2, if the power of the interfering signal I1 at −100 kHz is much larger than the power of the useful signal S at +100 kHz, in particular if the difference D between the powers of the two signals I1 and S is higher than 40 dB (i.e. D>40 dB), the RF imbalance compensation function and the calibration of the I and Q branches might not guarantee sufficient rejection of the interfering signal I1, or rather might not guarantee a sufficiently "small" cochannel image signal I1$i$ to enable correct demodulation and processing of the useful signal S by the DSP and/or FPGA 20.

In addition, FIG. 2 also shows a further interfering signal I0 at 0 Hz produced by interfering signals, even far away (>>0.1 MHz), owing to the quadratic characteristic of the IF vector demodulator 13.

In the past, some stratagems have been researched and developed to try to mitigate the image band problem. For example, United States patent application US 2006/0141974 A1 proposes a low IF mixer for down-converting an RF signal to a predetermined fixed IF, in which the energy of the sidebands of the predetermined IF is evaluated in order to select, for the IF demodulation of the RF signal, the frequency of the respective local oscillator (RF+IF or RF−IF) associated with the sideband having a lower energy level. In other words, according to US 2006/0141974-A1, the selection of the frequency for the local oscillator (RF+IF or RF−IF) is made on the basis of the energy measured beforehand over the spectrum. In particular, according to US 2006/0141974 A1, the frequency value selected for the local oscillator (RF+IF or RF−IF) is that which, on the basis of the energy measurements previously performed, enables obtaining a received signal having a lower energy level.

Unfortunately, the low IF mixer described in US 2006/0141974 A1 does not enable the image band problem to be completely solved. In fact, the low IF mixer in accordance with US 2006/0141974 A1 does not enable correct demodulation of a useful signal received in the case where interfering signals create inference on both the sidebands of the predetermined IF.

Furthermore, U.S. Pat. No. 8,160,529 B1 describes an RF receiver that includes: a local oscillator that receives a control signal and that generates a local oscillator signal at a local oscillator frequency based on the control signal; an analog IF mixer that generates an IF signal based on an RF signal and the local oscillator signal; a BB digital mixer that generates a BB signal based on the IF signal and an IF oscillator signal; and a channel monitoring module that generates the control signal based on the BB signal.

Unfortunately, the receiver in accordance with U.S. Pat. No. 8,160,529 B1 suffers from an important technical problem, namely the search for and selection of a new IF to use in reception in order to reduce interference, which can only be carried out by interrupting the reception service. Furthermore, using the receiver in accordance with U.S. Pat. No. 8,160,529 B1 in a variable RF scenario (common in mobile devices), it might be necessary to frequently interrupt reception, producing continuous and prolonged periods of service unavailability that certain applications might not be able to tolerate.

To minimize this problem, recourse is made in U.S. Pat. No. 8,160,529 B1 to a specially provided look-up table for storing all of the acquired evaluation parameters, so as to be able to recall them in cases of reception degradation. However, once populated with the acquired evaluation parameters, this table is no longer updated and, in consequence, might no longer be valid in cases where the RF scenario has changed in the meantime.

It should also be noted that, according to U.S. Pat. No. 8,160,529 B1, in order to speed up the creation of the above-mentioned table, the number of IFs is limited to discrete factors multiple of N (where N is a positive integer).

Furthermore, United States patent application US 2007/0207736 A1 describes a method for reducing adjacent channel interference that includes: determining a desired channel of an RF signal; determining a plurality of local oscillations for the desired channel; determining a proximal power level of an image frequency of each of the plurality of potential local oscillations to produce a plurality of proximal power levels; and selecting one of the plurality of potential local oscillations for down converting the desired channel based on the plurality of proximal power levels.

According to US 2007/0207736 A1, the search for a favourable IF frequency is performed during a preliminary phase prior to commencing actual reception (i.e. when the receiver is still not active).

In the process, as in the case of U.S. Pat. No. 8,160,529 B1, the reliability of the reception service can be precarious if the receiver is of the mobile type and, in consequence, the levels of the reception spectrum are variable (given that the receiver could be moved).

To minimize the problem of a long wait and long interruption of service, according to US 2007/0207736 A1, storage of the last local oscillation frequency used for a specific, previously activated reception channel is introduced. However, this stratagem cannot solve the problem for mobile receivers because, by changing the position of the receiver, it might be necessary to find a new favourable IF and the previously used local oscillation frequency might no longer be valid.

Furthermore, United States patent application US 2009/0310721 A1 describes a method of selecting an IF that includes: measuring a first signal quality on a first channel at a first IF; measuring a second signal quality on the first channel at a second IF; and selecting the IF with the best signal quality.

In particular, United States patent application US 2009/0310721 A1 relates to the television receiver sector, where the OFDM modulation mode entails using a fast Fourier transform (FFT), necessary for multiple QPSK demodulation of all the symbols of the innumerable QPSK carriers on the received channel.

Also in the case of US 2009/0310721 A1 (as for U.S. Pat. No. 8,160,529 B1 and US 2007/0207736 A1), the search for the best IF is made to the detriment of interrupting the "normal" reception service. Naturally, in the television receiver sector, interruption of the normal reception service to enable searching for the best IF is tolerated because this search is generally incorporated in the lengthy automatic search for television channels. Furthermore, since a television receiver is generally stationary, the choice of the best IF will be valid for a long time.

Furthermore, United States patent application US 2005/0143040 A1 describes a method and an apparatus for enhancing signal quality in a wireless receiver. According to US 2005/0143040 A1, an image of a desired signal is down-converted to a corresponding BB signal by a digital converter and the energy of this BB signal is determined. If the energy of the BB signal is equal to or greater than a predetermined threshold, then the IF is swapped for any incoming signals. Instead, if the energy of the BB signal is less than a predetermined threshold, then the IF is maintained for any incoming signals.

In particular, the wireless receiver in accordance with US 2005/0143040 A1 uses a switch matrix that enables demodulation to BB, alternatively, of the desired channel or of the image frequency. In other words, the wireless receiver in accordance with US 2005/0143040 A1 swaps components I and Q with each other and measures, at successive instants of time, both the energy of the desired channel and the energy of the image band signal. However, also this procedure (as is also the case of U.S. Pat. No. 8,160,529 B1, US 2007/0207736 A1 and US 2009/0310721 A1) entails interruption of the normal reception service.

OBJECT AND SUMMARY OF THE INVENTION

Object of the present invention is therefore that of providing an IF receiver that is able, in general, to solve the image band problem and, in particular, to reject any interfering signals so as to ensure correct demodulation of a received useful signal without having to interrupt the reception service.

The aforesaid object is achieved by the present invention in so far as it relates to a receiver, as defined in the appended claims.

In particular, the aforesaid object is achieved by the present invention in so far as it relates to a receiver configured to receive a radio frequency signal and comprising:
  a vector demodulator configured to demodulate the received radio frequency signal at an intermediate reception frequency outputting a corresponding analog in-phase component and a corresponding analog quadrature component having said intermediate reception frequency;
  a first local oscillator coupled with the vector demodulator and configured to provide said vector demodulator with a first operating frequency related to the intermediate reception frequency;

filtering means configured to filter the analog in-phase and quadrature components;

analog-to-digital conversion means configured to convert the filtered analog in-phase and quadrature components into corresponding digital in-phase and quadrature components;

a digital baseband demodulator configured to perform baseband demodulation of the digital in-phase and quadrature components outputting a corresponding digital baseband signal;

a second local oscillator coupled with the digital baseband demodulator and configured to provide said digital baseband demodulator with a second operating frequency related to the intermediate reception frequency;

digital processing means configured to process the digital baseband signal; and a monitoring branch configured to
  carry out, on the basis of the digital in-phase and quadrature components, a monitoring of interference experienced at a plurality of intermediate frequencies usable in reception, and
  select the intermediate reception frequency from the intermediate frequencies usable in reception on the basis of the interference monitoring carried out.

The receiver according to the present invention is characterized in that the monitoring branch comprises:
  a digital mixer configured to perform real-time frequency shifts of the digital in-phase and quadrature components outputting, for each real-time frequency shift performed, a corresponding shifted digital signal; wherein each real-time frequency shift performed by the digital mixer is associated with a corresponding intermediate frequency usable in reception;
  a third local oscillator coupled with the digital mixer and configured to provide said digital mixer with third operating frequencies, each third operating frequency being related to a corresponding intermediate frequency usable in reception; and
  a monitoring unit configured to
    carry out, on the basis of the shifted digital signals outputted by the digital mixer, a real-time monitoring of the interference experienced at the currently used intermediate reception frequency and also at the other intermediate frequencies usable in reception,
    change, in real time, the used intermediate reception frequency on the basis of the real-time interference monitoring by changing, in real time, the first operating frequency provided by the first local oscillator to the vector demodulator and the second operating frequency provided by the second local oscillator to the digital baseband demodulator.

BRIEF DESCRIPTION OF DRAWINGS

For a better understanding of the present invention, some preferred embodiments, provided by way of explanatory and non-limitative example, will now be illustrated with reference to the attached drawings (not to scale), where.

DETAILED DESCRIPTION OF PREFERRED EMBODIMENTS OF THE INVENTION

The following description is provided to enable an expert in the field to embody and use the invention. Various modifications to the embodiments shown will be immediately obvious to experts and the generic principles described herein could be applied to other embodiments and applications without departing from the scope of protection of the present invention.

Thus, the present invention is not intended to be limited to the embodiments described and shown herein, but is to be accorded the widest scope consistent with the principles and features disclosed herein and defined in the appended claims.

In general, the present invention relates to an IF receiver designed to dynamically select the IF used in reception so as to reject any interfering signals.

In particular, the IF receiver according to the present invention is designed to shift a received RF signal to an IF by means of an analog IF mixer that produces corresponding signals I and Q, which are acquired by high sampling frequency A/D conversion means and successively converted from IF to BB in the digital domain by means of a BB digital mixer. According to the present invention, the IF used in reception is chosen dynamically as a function of one or more possible interfering signals and the useful signal band.

In detail, the IF receiver according to the present invention uses a monitoring branch to inspect the spectral situation simultaneously with reception at the operating frequency. In this way, the IF receiver is able to predict the frequency jump to perform if RF conditions arise such that the IF chosen for receiving at the operating frequency must be abandoned. This prediction enables always receiving under the best conditions with respect to radio interference and noise, unlike a receiver that only selects the IF used in reception a posteriori, or rather that, after having performed reception at the operating frequency in disturbed conditions, carries out an IF change without any guarantee of reliability with respect to that choice.

Specifically, the IF receiver according to the present invention uses a monitoring branch capable of measuring the power of interfering signals at the frequencies that could cause receiver desensitization.

More specifically, in the IF receiver according to the present invention, background monitoring is carried out on the interfering signals at the various usable IFs by means of an opportune frequency shifting branch that is connected to the A/D conversion means and which enables keeping an up-to-date table of IF values with the related reception quality, on the basis of which the best IF value to use can be chosen. In this way, the interfering signals that enter the band of the A/D conversion means, typically ±10 MHz, are avoided by placing the useful signal in the least disturbed position.

Figure 3:
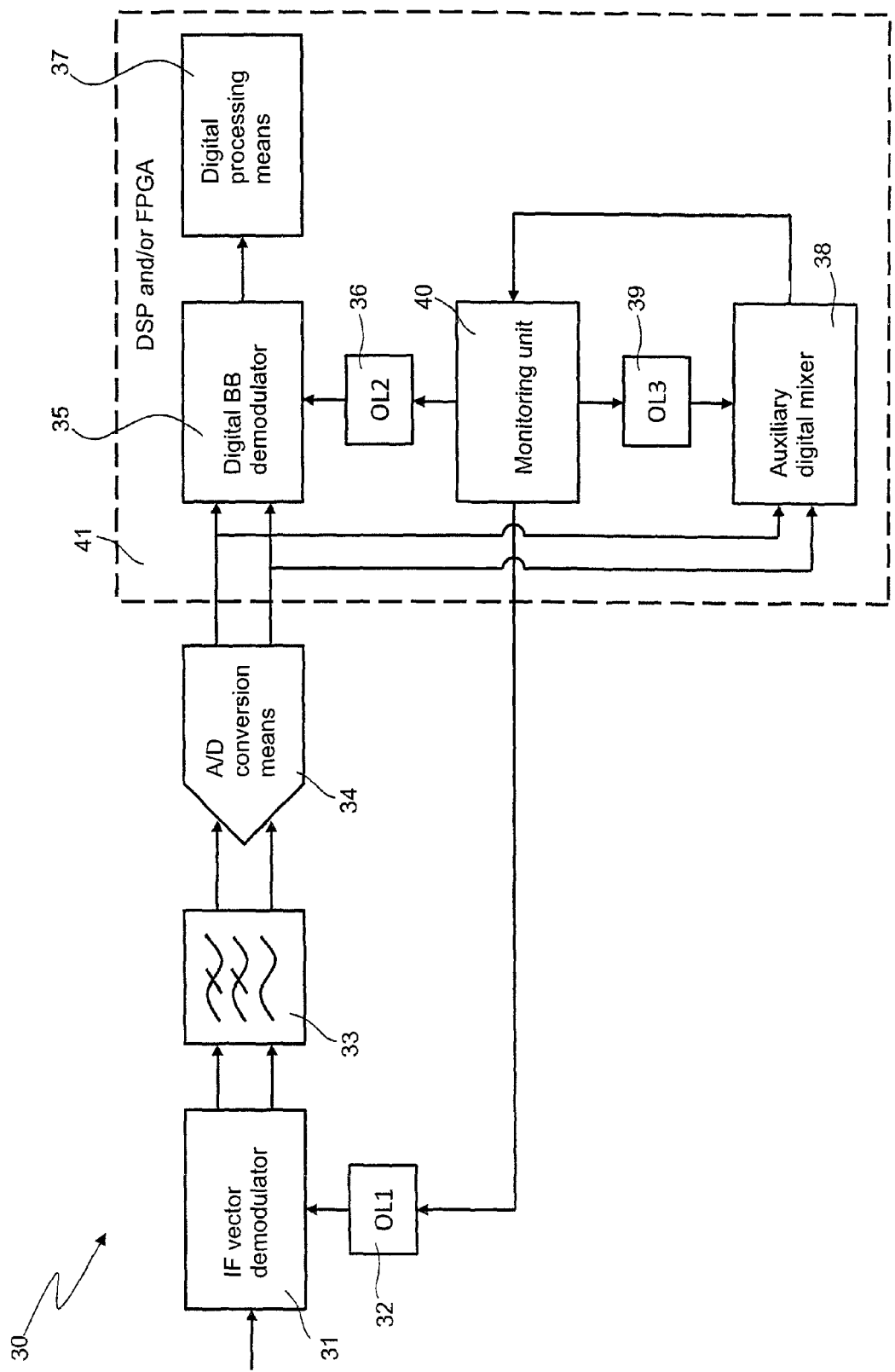
FIG. 3 schematically shows the architecture of an IF receiver according to a preferred embodiment of the present invention.

For a better understanding of the present invention, FIG. 3 shows a functional block diagram that represents an architecture of an IF receiver (indicated as a whole by reference numeral 30) according to a preferred embodiment of the present invention.

In particular, the IF receiver 30 is designed to receive a signal at an RF $f_0$, specifically by means of an opportune antenna (not shown in FIG. 3 for simplicity of illustration)

conveniently connected to an amplifier (this also not shown in FIG. 3 for simplicity of illustration) for amplification of the received RF signal.

Furthermore, as shown in FIG. 3, the IF receiver 30 comprises:
- an IF vector demodulator 31, which will hereinafter also be referred to as an analog IF mixer and which is designed to shift the received RF signal to a reception IF $f_{IF}$ outputting a corresponding component I having said reception IF $f_{IF}$ and a corresponding component Q having said reception IF $f_{IF}$; said IF vector demodulator 31 using, for the shift to the reception IF $f_{IF}$, a signal with a frequency $f_{OL1}=f_0-f_{IF}$ generated by a first local oscillator (OL1) 32;
- low-pass filtering means 33 coupled with the IF vector demodulator 31 and designed to apply low-pass filtering to the components I and Q provided by the IF demodulator 31;
- A/D conversion means 34 coupled with the low-pass filtering means 33 and designed to convert the analog components I and Q filtered by the low-pass filtering means 33 into corresponding digital components I and Q;
- a digital BB demodulator 35, which will hereinafter also be referred to as a BB digital mixer and which is coupled with the A/D conversion means 34 and is configured to demodulate the digital components I and Q provided by the A/D conversion means 34 outputting a corresponding digital BB signal; said IF vector demodulator 31 using a second local oscillator (OL2) 36 for the shift to BB (i.e. by $-f_{IF}$) of the digital complex signal IQ provided by the A/D conversion means 34;
- digital processing means 37 coupled with the digital BB demodulator 35 and configured to process the digital BB signal provided by the digital BB demodulator 35;
- an auxiliary digital mixer 38 coupled with the A/D conversion means 34 and configured to perform frequency shifts of the digital components I and Q provided by the A/D conversion means 34 using a third local oscillator (OL3) 39 and outputting, for each frequency shift performed, a corresponding shifted digital signal; wherein each frequency shift performed by the auxiliary digital mixer 38 and, therefore, also the corresponding shifted digital signal that is outputted are associated with a corresponding monitored IF; and
- a monitoring unit 40 coupled with the auxiliary digital mixer 38, with the OL1 32, with the OL2 36 and with the OL3 39, and configured to
  - compute the respective power of each shifted digital signal provided by the auxiliary digital mixer 38,
  - select the reception IF $f_{IF}$ from the various monitored IFs on the basis of the computed powers,
  - control the operation of the OL1 32 by setting the respective operating frequency $f_{OL1}$ on the basis of the selected reception IF $f_{IF}$ (where $f_{OL1}=f_0-f_{IF}$),
  - control the operation of the OL2 36 by setting the respective operating frequency $f_{OL2}$ on the basis of the selected reception IF $f_{IF}$ (where $f_{OL2}=-f_{IF}$), and
  - control the operation of the OL3 39 by dynamically varying the respective operating frequency $f_{OL3}$ so as to be able to monitor a plurality of predetermined IFs.

Conveniently, the BB digital mixer 35, the OL2 36, the digital processing means 37, the auxiliary digital mixer 38, the OL3 39 and the monitoring unit 40 are implemented by means of a DSP and/or an FPGA (indicated as a whole in FIG. 3 by reference numeral 41). In particular, the OL2 36 and the OL3 39 can be implemented via computational processes of the FPGA, or via firmware in the DSP.

Preferably, the low-pass filtering means 33 comprise:
- a first low-pass filter (not shown in FIG. 3 for simplicity of illustration) designed to apply low-pass filtering to the component I provided by the IF demodulator 31; and
- a second low-pass filter (this also not shown in FIG. 3 for simplicity of illustration) designed to apply low-pass filtering to the component Q provided by the IF demodulator 31.

Always preferably, the A/D conversion means 34 comprise:
- a first A/D converter (not shown in FIG. 3 for simplicity of illustration) coupled with the first low-pass filter and designed to convert the analog component I filtered by the first low-pass filter into a corresponding digital component I; and
- a second A/D converter (this also not shown in FIG. 3 for simplicity of illustration) coupled with the second low-pass filter and designed to convert the analog component Q filtered by the second low-pass filter into a corresponding digital component Q.

As occurs in conventional superheterodyne receivers, the use of a non-zero IF entails the presence of a spurious reception frequency at frequency $f_0-2f_{IF}$ when OL1 32 works at frequency $f_0-f_{IF}$. The vector structure of the IF receiver 30 partially reduces the undesired spurious frequency, but without completely eliminating it due to the imperfect geometry of the receiver 30 (phase/gain imbalance), obtaining an attenuation factor of 40-60 dB after opportune calibration.

The variable-IF structure according to the present invention avoids disturbance of the signal positioned at the image frequency by changing the IF value, so as to avoid/minimize this disturbance.

In use, the monitoring unit 40 takes measurements in the spectrum of the acquired digital signal at frequencies where an interfering signal, if of a high level, could create 20 degradation in reception of the useful signal.

If the IF receiver 30 is tuned to receive RF $f_0$ and uses IF $f_{IF}$ in reception, the spurious image frequency is given by $f_0-2f_{IF}$, which corresponds to the spectrum at point $-f_{IF}$ on the acquired digital signal. The monitoring unit 40 compares the power of the interfering signal $P_I$ measured at frequency $-f_{IF}$ with that $P_U$ of the useful signal measured at $f_{IF}$ so as to obtain the difference D, which represents the suitable parameter for deciding the IF change. Conveniently, the monitoring unit 40 decides to change the IF used in reception if it is found that D>40 dB. This selection criterion is applied to each one of the IFs usable in reception.

In particular, in use, the monitoring unit 40 stores and keeps up-to-date a table containing the IF values usable in reception and therefore monitored, and, for each monitored IF value:
- the corresponding image frequency value Fr−Im (frequency where the spurious image is present);
- the value of the operating frequency $f_{OL1}$ of OL1 32;
- the value of the operating frequency $f_{OL2}$ of OL2 36;
- the corresponding value of the operating frequency $f_{OL3}$ of OL3 39;
- the power $P_I$ of the interfering signal measured at the corresponding image frequency Fr−Im; and
- the difference D between said measured power $P_1$ of the interfering signal and the measured power $P_U$ of the useful signal.

With regard to this, an example is provided below of a table used by a monitoring unit 40 that, in use, monitors four possible IF values, specifically $f_{IF1}$, $f_{IF2}$, $f_{IF3}$ and $f_{IF4}$, and which compiles this table while the IF receiver 30 is using IF $f_{IF}=f_{IF2}$ in reception.

TABLE

| IF | Fr – Im | $f_{OL1}$ | $f_{OL2}$ | $f_{OL3}$ | $P_I$ | D |
|---|---|---|---|---|---|---|
| $f_{IF1}$ | $f_0 - 2f_{IF1}$ | $f_0 - f_{IF2}$ | $-f_{IF2}$ | $-(f_{IF2} - 2f_{IF1})$ | $P_{I1}$ | $P_{I1} - P_U$ |
| $f_{IF2}$ | $f_0 - 2f_{IF2}$ | $f_0 - f_{IF2}$ | $-f_{IF2}$ | $-(f_{IF2} - 2f_{IF2})$ | $P_{I2}$ | $P_{I2} - P_U$ |
| $f_{IF3}$ | $f_0 - 2f_{IF3}$ | $f_0 - f_{IF2}$ | $-f_{IF2}$ | $-(f_{IF2} - 2f_{IF3})$ | $P_{I3}$ | $P_{I3} - P_U$ |
| $f_{IF4}$ | $f_0 - 2f_{IF4}$ | $f_0 - f_{IF2}$ | $-f_{IF2}$ | $-(f_{IF2} - 2f_{IF4})$ | $P_{I4}$ | $P_{I4} - P_U$ |

The updated table enables the monitoring unit 40 to know in advance the best IF to use in reception if disturbance conditions arise such that it is necessary to abandon the current IF $f_{IF}=f_{IF2}$, i.e., in the case where the monitoring unit 40 finds $P_{I2}-P_U>40$ dB.

Conveniently, the IF reception architecture according to the present invention enables monitoring and, therefore, also using $f_{IF}=0$ in reception, i.e. it allows the IF receiver 30 to also function as a direct-conversion receiver. As is known, in the case of direct-conversion reception (i.e. with $f_{IF}=0$), the problem of spurious reception on the image frequency does not exist. However, because of the finite rejection of the IF vector demodulator 31 with respect to the modulated AM signals, due to the not very high value (maximum +60 dBm) of the second order intercept point (IP2), the residual disturbance of all the AM signals present at the input of the IF vector demodulator 31 accumulate precisely around the zero frequency, thereby introducing quality degradation of the received signal. Nevertheless, in the case where the monitoring unit 40, in use, finds that the best IF to use in reception is actually $f_{IF}=0$, it can conveniently make the receiver 30 start to operate in direct conversion mode.

Figure 1:
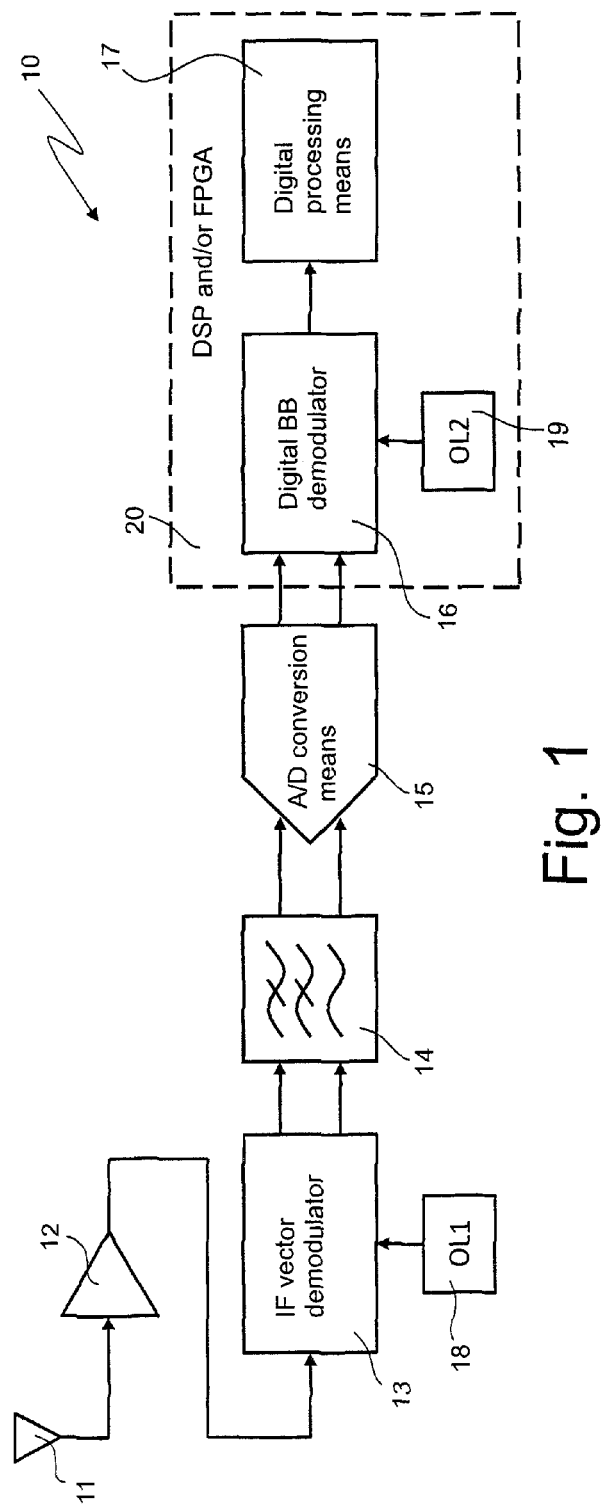
FIG. 1 schematically shows a typical architecture of an IF receiver according to the known art.
Figure 2:
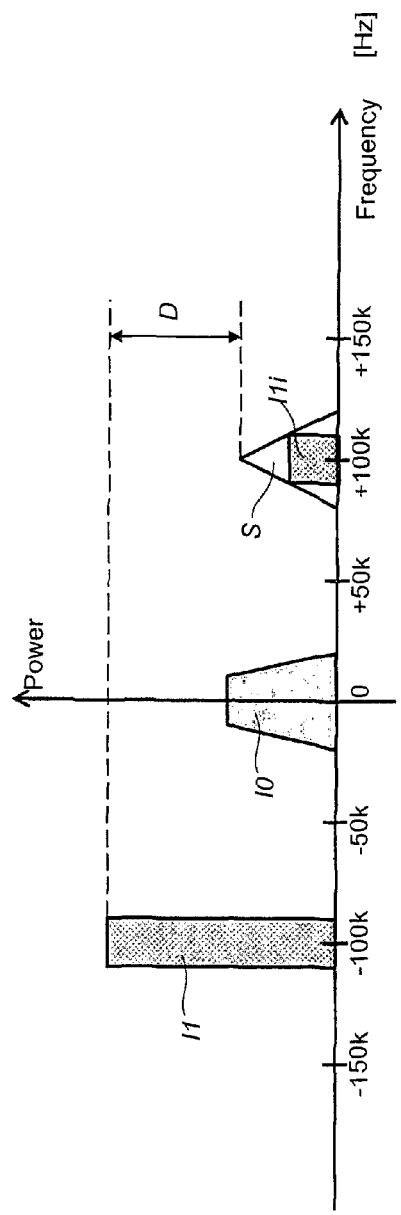
FIG. 2 schematically shows an example of operating scenario in which the IF receiver of FIG. 1 suffers from the so-called image band problem.
Figure 4:
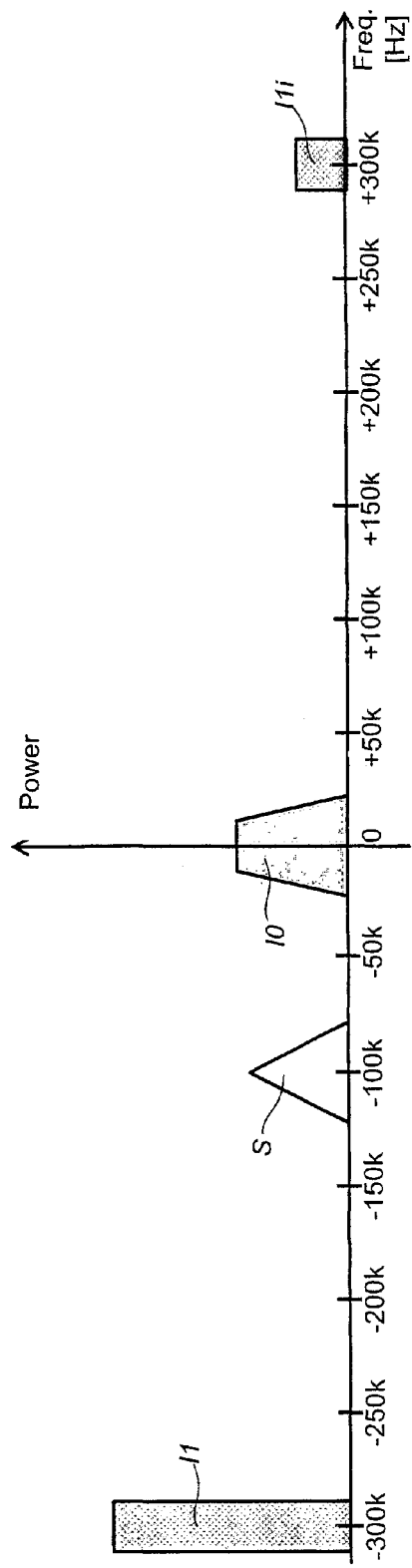
FIGS. 4 and 5 schematically show two possible choices of the IF to use in reception that can be employed by the IF receiver of FIG. 3 in order to solve the image band problem shown in FIG. 2.
Figure 5:
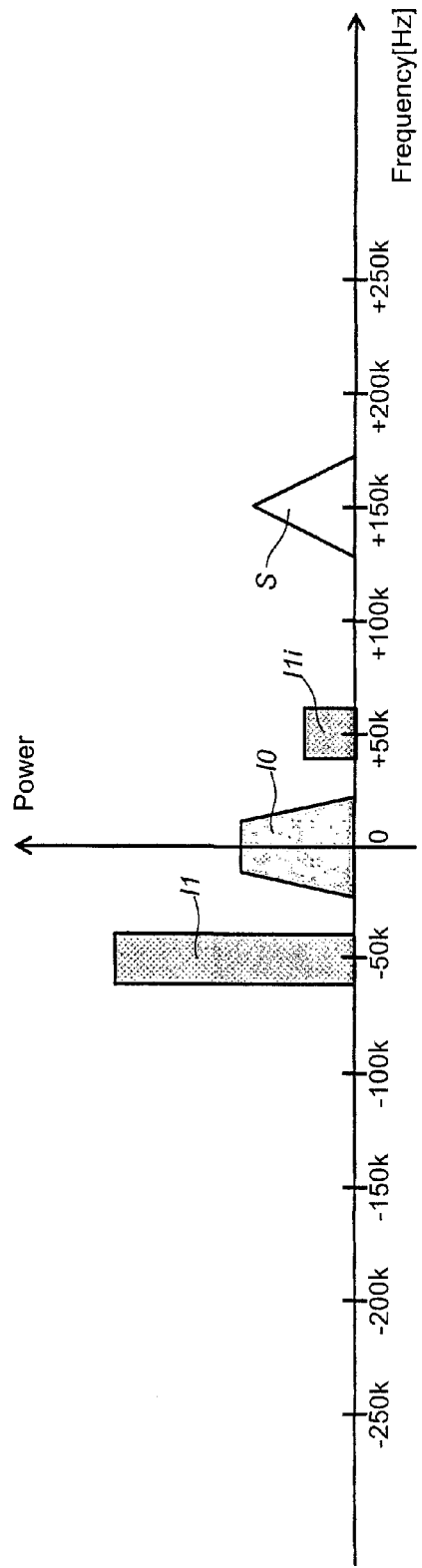

Finally, it is wished to draw attention to the IF reception scenario shown in FIG. 2 and previously described in detail. In this scenario, the monitoring unit 40 would find that the difference D between the power of the interfering signal I1 at −100 kHz and the power of the useful signal S at +100 kHz is greater than 40 dB, and therefore said monitoring unit 40 would decide to change the IF used in reception by selecting a new IF value associated with a smaller power difference D, for example, it could select IF value $f_{IF}=-100$ kHZ, as shown in FIG. 4, or IF value $f_{IF}=+150$ kHZ, as shown in FIG. 5.

The advantages of the present invention can be immediately appreciated from the foregoing description.

In particular, it is important to underline that the IF reception architecture according to the present invention is extremely flexible because it combines the advantages of a low IF reception architecture with the capacity to react to the presence of proximal and remote interfering signals and to implement a plurality of waveforms with different frequency bands (30 MHz-1 GHz). Thus, the receiver according to the present invention can be exploited to provide mobile radio devices, both portable and vehicular, with very high performance in terms of band coverage, reception modes and waveforms used.

Furthermore, the IF receiver according to the present invention can be exploited for many applications, such as professional, military and avionic applications, etc., it being possible to use it in combination with different communications, such as TETRA, GSM-R and SDR technologies. Alternatively, the IF receiver according to the present invention can also be used to produce a so-called Digital Media Receiver (DMR).

In particular, the IF receiver according to the present invention combines the advantages of superheterodyne systems with those of direct-conversion systems. In fact, as in superheterodyne systems, the IF receiver according to the present invention is able to filter proximal interfering signals by acting as an RC filter prior to the A/D conversion, similarly to the traditional quartz filter. Furthermore, as in direct-conversion systems, the IF receiver according to the present invention uses just the analog mixer IQ for frequency conversion and, in consequence, a single local oscillator. For all these reasons, the IF receiver according to the present invention has high resistance to interfering signals and, therefore, high efficiency, high reliability, simplicity and low manufacturing costs, low consumption, signal bandwidth flexibility, ease of use for end users and is suitable for covering wide operating frequency ranges.

Furthermore, the IF reception architecture according to the present invention also enables using other possible modes of reception, for example, it allows performing direct conversion (i.e. $f_{IF}=0$), or using high value IFs (for example, $f_{IF}=70$ MHz or $f_{IF}=90$ MHz) in cases where it is of interest to favour certain reception parameters.

Finally, it is wished to underline that the IF reception architecture according to the present invention enables searching for the best IF to use in reception by performing real-time adaptive monitoring of the spectrum level of all the received signal, without ever interrupting the normal reception service. In particular, real-time adaptive monitoring of the spectrum level of all the received signal without interruption of the reception service is achieved by the present invention thanks to the use of a specific monitoring branch comprising the auxiliary digital mixer 38, the third local oscillator (OL3) 39 and the monitoring unit 40. This distinctive feature of the present invention cannot be found in currently known IF receivers and, in particular, cannot be found in the IF receivers and IF reception methods described in U.S. Pat. No. 8,160,529 B1, US 2007/0207736 A1, US 2009/0310721 A1 and US 2005/0143040 A1. In fact, as previously explained, these prior art documents contemplate that searching for the best IF to use in reception is carried out by blocking the normal reception service. Thus, the aforesaid distinctive feature of the present invention (namely the real-time adaptive monitoring of the spectrum level of all of the received signal without interruption of the reception service thanks to the use of the aforesaid specific monitoring branch), unlike the IF receivers and IF reception methods described in U.S. Pat. No. 8,160,529 B1, US 2007/0207736 A1, US 2009/0310721 A1 and US 2005/0143040 A1, enables guaranteeing continuity of service even when the spectral trend of the received signal is variable and, consequently, also using the IF receiver according to the present invention for mobile applications that envisage high movement speeds for the receivers employed.

A further difference between the present invention and the U.S. Pat. No. 8,160,529 B1 lies in the fact that the number of IFs monitored by the IF receiver according to the present invention is not limited to discrete factors multiple of N (as is the case of U.S. Pat. No. 8,160,529 B1). In fact, according to the present invention, the monitored IFs can also have continuous resolution, with a consequently greater probability of finding a more favourable IF.

Finally, it is clear that various modifications can be applied to the present invention without departing from the scope of the invention defined in the appended claims.

The invention claimed is:

1. A receiver configured to receive a radio frequency signal, the receiver comprising:
   a vector demodulator configured to demodulate the received radio frequency signal at an intermediate reception frequency outputting a corresponding analog in-phase component and a corresponding analog quadrature component having said intermediate reception frequency;

a first local oscillator coupled with the vector demodulator and configured to provide said vector demodulator with a first operating frequency related to the intermediate reception frequency;

filtering means configured to filter the analog in-phase and quadrature components;

analog-to-digital conversion means configured to convert the filtered analog in-phase and quadrature components into corresponding digital in-phase and quadrature components;

a digital baseband demodulator coupled with the analog-to-digital conversion means to receive the digital in-phase and quadrature components and configured to perform baseband demodulation of the digital in-phase and quadrature components outputting a corresponding digital baseband signal;

a second local oscillator coupled with the digital baseband demodulator and configured to provide said digital baseband demodulator with a second operating frequency related to the intermediate reception frequency;

digital processing means configured to process the digital baseband signal; and a monitoring branch configured to:
carry out, on the basis of the digital in-phase and quadrature components, a monitoring of interference experienced at a plurality of intermediate frequencies usable in reception; and
select the intermediate reception frequency from the intermediate frequencies usable in reception on the basis of the interference monitoring carried out;

wherein the monitoring branch comprises:
a digital mixer coupled with the analog-to-digital conversion means to receive the digital in-phase and quadrature components and configured to perform real-time frequency shifts of the digital in-phase and quadrature components outputting, for each real-time frequency shift performed, a corresponding shifted digital signal; wherein each real-time frequency shift performed by the digital mixer is associated with a corresponding intermediate frequency usable in reception; and a monitoring unit, which is
coupled with:
the digital mixer to receive the shifted digital signals;
the first local oscillator to set the first operating frequency provided by said first local oscillator to the vector demodulator; and
the second local oscillator to set the second operating frequency provided by said second local oscillator to the digital baseband demodulator; and
configured to:
carry out, on the basis of the shifted digital signals outputted by the digital mixer, a real-time monitoring of interference experienced at the currently used intermediate reception frequency and also at the other intermediate frequencies usable in reception; and
change, in real time, the used intermediate reception frequency on the basis of the real-time interference monitoring by changing, in real time, the first operating frequency provided by the first local oscillator to the vector demodulator and the second operating frequency provided by the second local oscillator to the digital baseband demodulator;

wherein:
the monitoring branch further comprises a third local oscillator coupled with the digital mixer and configured to provide said digital mixer with third operating frequencies, each third operating frequency being related to a corresponding intermediate frequency usable in reception; and
the monitoring unit is coupled with the third local oscillator and is further configured to dynamically vary the third operating frequencies provided by said third local oscillator to the digital mixer so as to enable real-time monitoring of interference experienced at all the intermediate frequencies usable in reception by the receiver.

2. The receiver of claim 1, wherein the monitoring unit is configured to:
carry out the real-time interference monitoring by computing, in real time and on the basis of the shifted digital signals outputted by the digital mixer,
a useful power and an interfering power at the currently used intermediate reception frequency, and,
for each of the other intermediate frequencies usable in reception, a respective interfering power at said intermediate frequency usable in reception; and
change, in real time, the used intermediate reception frequency on the basis of the computed powers.

3. The receiver of claim 2, wherein the monitoring unit is further configured to compute in real time:
a first indicator of the interference experienced at the currently used intermediate reception frequency on the basis of the computed useful power and of the computed interfering power at the currently used intermediate reception frequency; and
for each of the other intermediate frequencies usable in reception, a respective second indicator of the interference experienced at said intermediate frequency usable in reception on the basis of the computed useful power and of the respective computed interfering power at said intermediate frequency usable in reception;
wherein the monitoring unit is configured to change, in real time, the used intermediate reception frequency on the basis of the computed first and second indicators.

4. The receiver of claim 3, wherein the monitoring unit is further configured to:
check, in real time, whether the computed first indicator exceeds a predetermined interference threshold; and
if the computed first indicator exceeds the predetermined interference threshold,
select, in real time, a new intermediate reception frequency from the other intermediate frequencies usable in reception on the basis of the respective computed second indicators,
change, in real time, the first operating frequency provided by the first local oscillator to the vector demodulator by setting a new first operating frequency related to the new intermediate reception frequency selected, and
change, in real time, the second operating frequency provided by the second local oscillator to the digital baseband demodulator by setting a new second operating frequency related to the new intermediate reception frequency selected.

5. The receiver of claim 4, wherein the monitoring unit is configured to, if the computed first indicator exceeds the predetermined interference threshold, select, as the new intermediate reception frequency, the intermediate frequency usable in reception for which the respective second indicator is the lowest of the computed second indicators.

6. The receiver according to claim 1, wherein:
the filtering means are coupled with the vector demodulator to receive the analog in-phase and quadrature components;
the analog-to-digital conversion means are coupled with the filtering means to receive the filtered analog in-phase and quadrature components; and
the digital processing means are coupled with the digital baseband demodulator to receive the digital baseband signal.

7. The receiver according to claim 1, wherein the filtering means comprise:
a first filter configured to filter the analog in-phase component outputted by the vector demodulator; and
a second filter configured to filter the analog quadrature component outputted by the vector demodulator; and
wherein the analog-to-digital conversion means comprise:
a first analog-to-digital converter coupled with the first filter and configured to convert the analog in-phase component filtered by the first filter into a corresponding digital in-phase component; and
a second analog-to-digital converter coupled with the second filter and configured to convert the analog quadrature component filtered by the second filter into a corresponding digital quadrature component.

* * * * *